Dec. 31, 1946.  H. F. VICKERS  2,413,393
POWER TRANSMISSION
Filed May 2, 1938  12 Sheets-Sheet 1

INVENTOR
HARRY F. VICKERS
BY
Barnes, Kisselle, Laughlin & Raisch
ATTORNEYS

Dec. 31, 1946.        H. F. VICKERS              2,413,393
                      POWER TRANSMISSION
                   Filed May 2, 1938          12 Sheets-Sheet 2
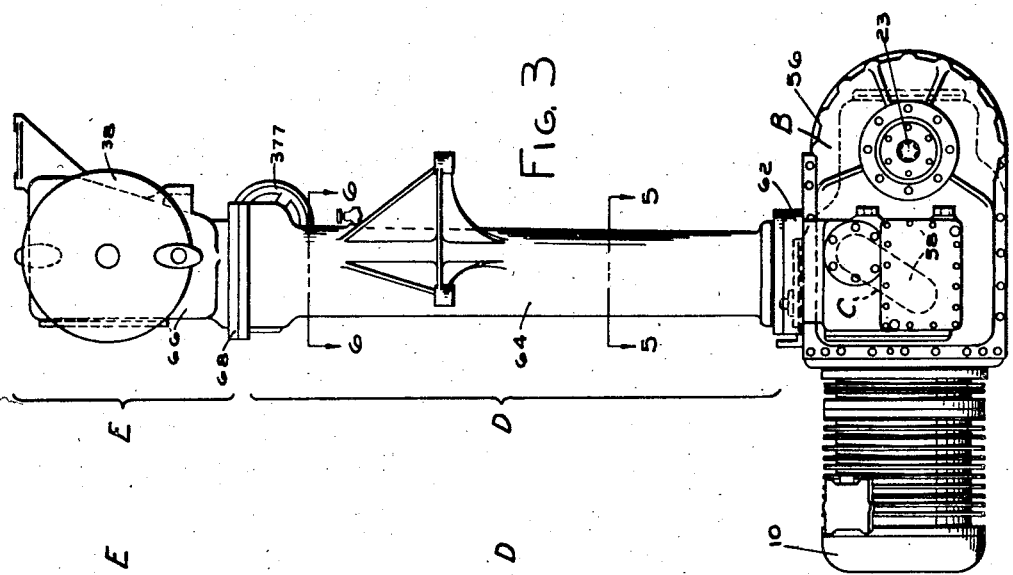
INVENTOR
HARRY F. VICKERS
BY
ATTORNEYS

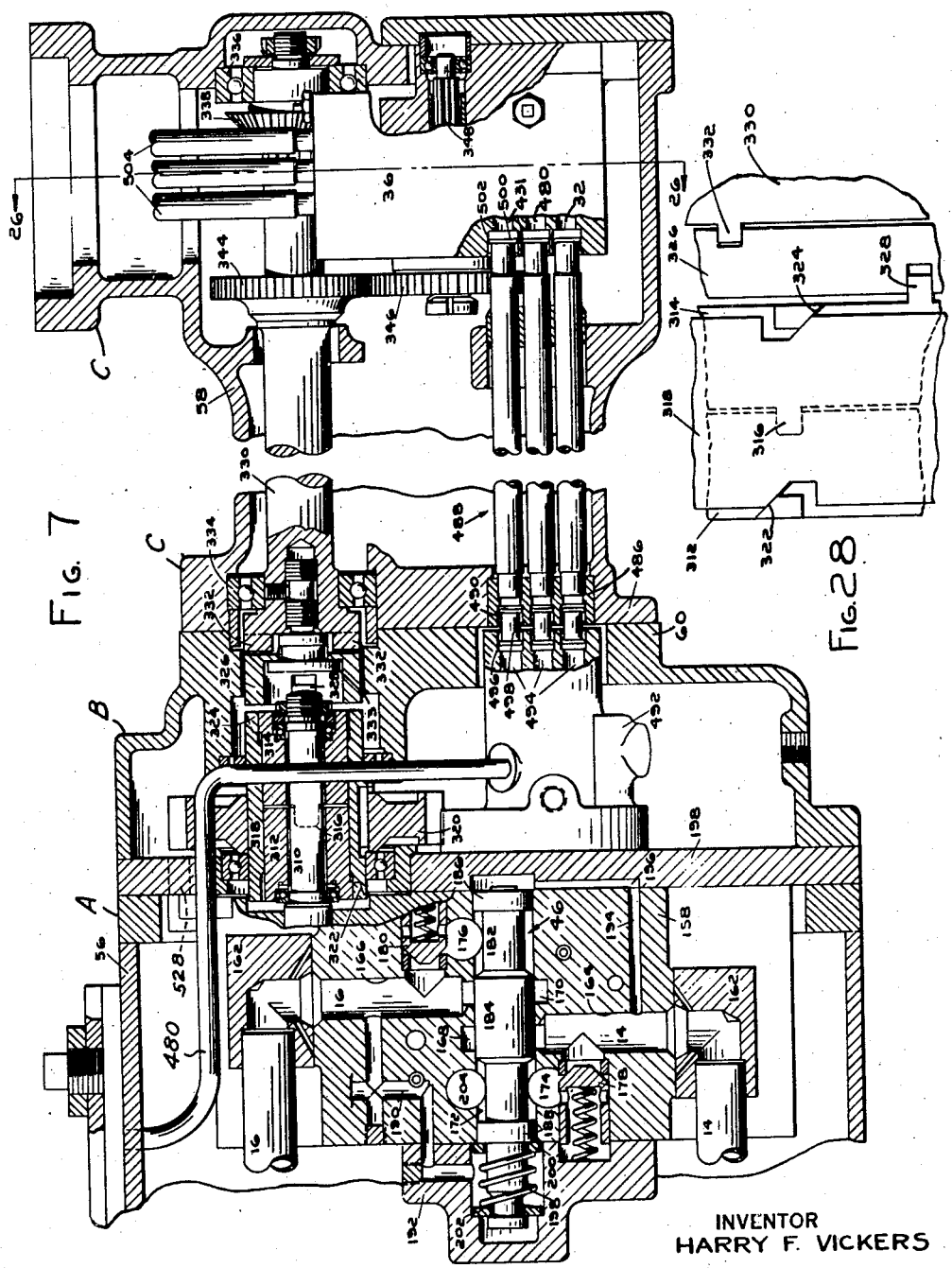

INVENTOR
HARRY F. VICKERS
BY
ATTORNEYS

Dec. 31, 1946.  H. F. VICKERS  2,413,393
POWER TRANSMISSION
Filed May 2, 1938  12 Sheets-Sheet 5

INVENTOR
HARRY F. VICKERS
BY
ATTORNEYS

Dec. 31, 1946. H. F. VICKERS 2,413,393
POWER TRANSMISSION
Filed May 2, 1938 12 Sheets-Sheet 6

INVENTOR
HARRY F. VICKERS
BY
ATTORNEYS

Dec. 31, 1946.            H. F. VICKERS            2,413,393
                           POWER TRANSMISSION
                          Filed May 2, 1938            12 Sheets-Sheet 10

INVENTOR
HARRY F. VICKERS
BY
ATTORNEYS

Dec. 31, 1946.  H. F. VICKERS  2,413,393
POWER TRANSMISSION
Filed May 2, 1938  12 Sheets-Sheet 11
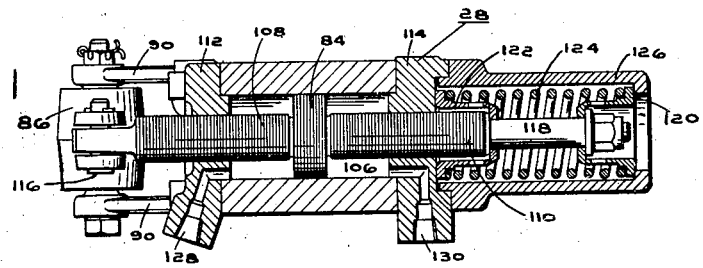
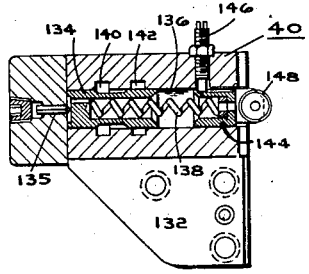
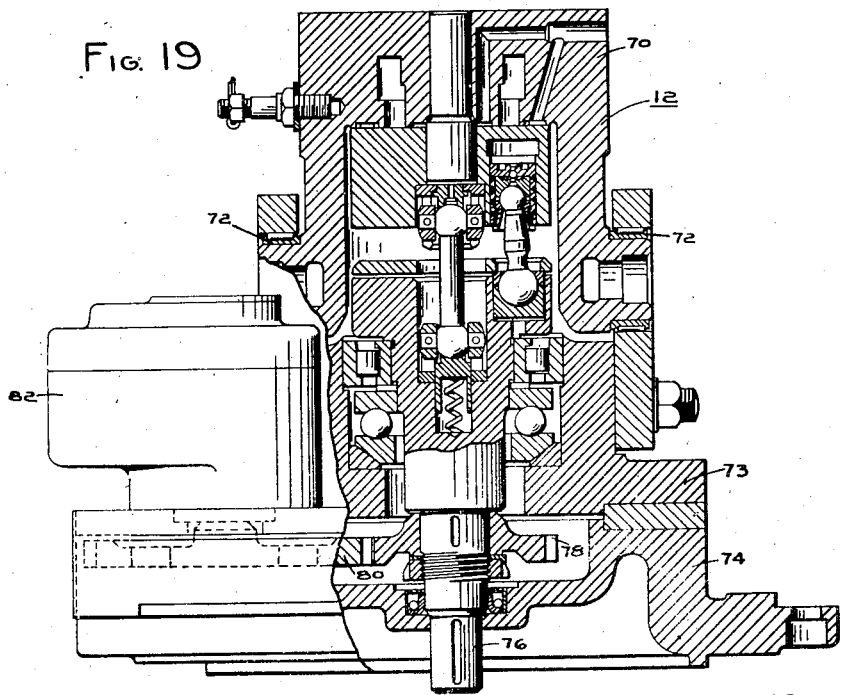
INVENTOR
HARRY F. VICKERS
BY
ATTORNEYS

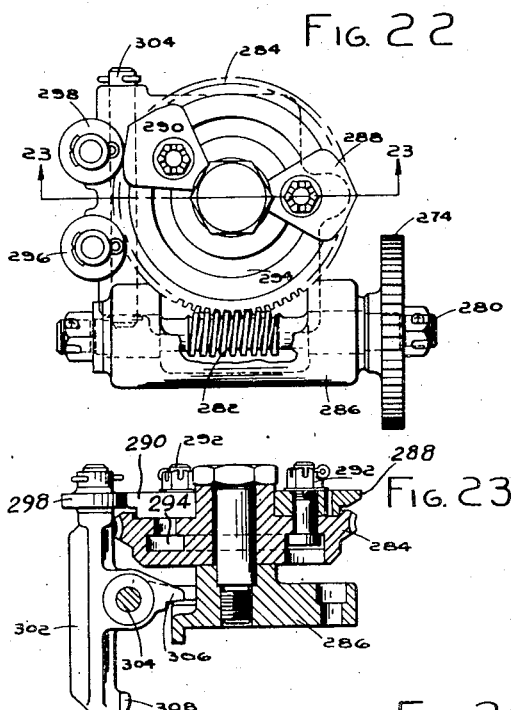
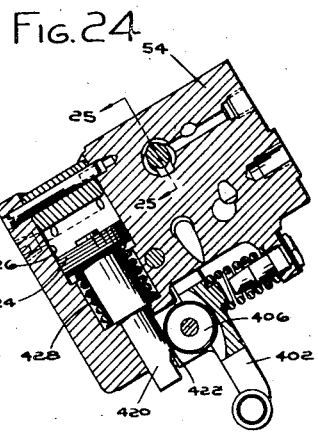
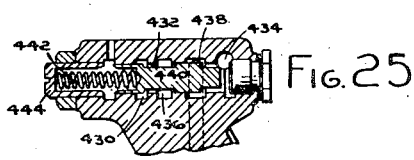
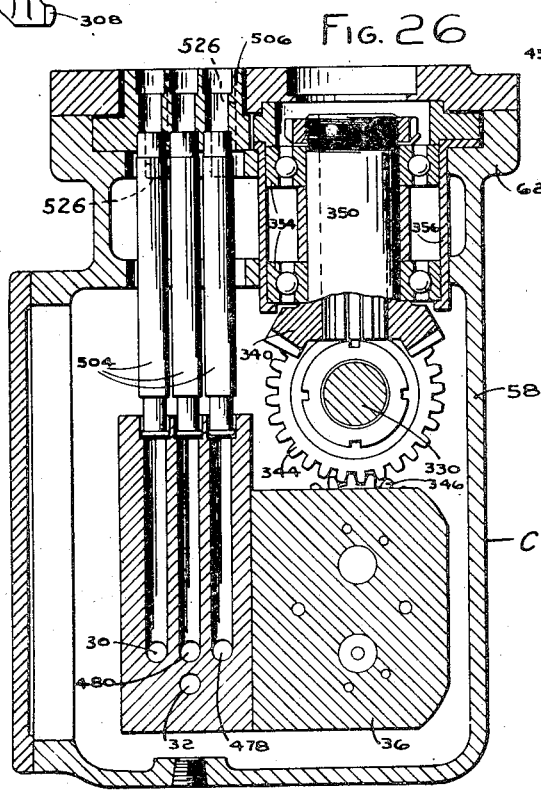
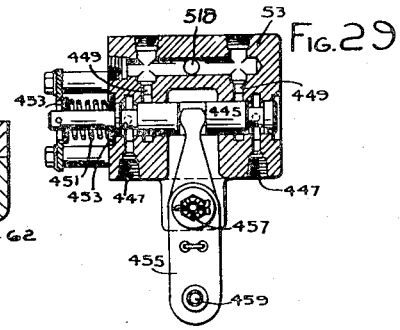
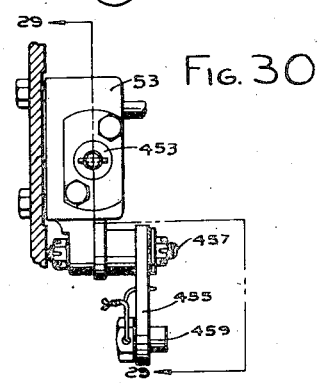
INVENTOR
HARRY F. VICKERS Patented Dec. 31, 1946

2,413,393

UNITED STATES PATENT OFFICE 2,413,393

POWER TRANSMISSION

Harry F. Vickers, Detroit, Mich., assignor to Vickers Incorporated, Detroit, Mich., a corporation of Michigan Application May 2, 1938, Serial No. 205,461

29 Claims. (Cl. 60—53)

This invention relates to power transmissions and more particularly to those of the fluid type wherein a power transmitting fluid, such as oil, and hereinafter referred to as such, is utilized for the transmission of power between one or more pumps and one or more fluid motors.

This invention is particularly concerned with a power transmission provided with a follow-up control mechanism for driving any suitable load device, such as a ship's rudder, or other device which it is desired to move at will to any desired position.

It is an object of the invention to provide a power transmission system incorporating improved follow-up control mechanism making use of a pilot control pump and a pilot response pump driven by the primary controlling member and by the output member, respectively, and so connected to the main transmission as to cause accurate follow-up motion of the driven member in response to actuation of the primary controlling member.

It is a further object to provide a synchronizing device for preventing accumulative errors due to leakage, slip, etc. in such a hydraulic follow-up control system.

It is also an object to provide improved means for protecting the prime mover and the transmission against excessive overloads imposed by the driven device, either in the resisting direction or in the overrunning direction.

It is also an object to provide a transmission system of the character described, wherein auxiliary drive means are provided independently of the prime mover, and wherein certain of the protective control means may be utilized while such auxiliary drive is in operation.

A further object is to provide automatic means of an improved form for rendering the auxiliary drive effective upon failure of the prime mover.

Another object is to provide the transmission system constructed in unitary sections permitting of ready assembly and disassembly and incorporating means for simultaneously coupling a plurality of interconnecting conduits and mechanical driving members concurrently with the assembling of two adjacent sections to one another.

A further object is to provide a unitary transmission system wherein all working parts are enclosed in a fluid reservoir and wherein the more vital elements may be protected against leakage of fluid or entrance of air, even though the reservoir be empty or broken.

Further objects and advantages of the present invention will be apparent from the following description, reference being had to the accompanying drawings wherein a preferred form of the present invention is clearly shown.

In the drawings:

Figure 2 is a front view of the assembled mechanism.

Figure 3 is a side view of the assembled mechanism.

Figure 4 is a section on line 4—4 of Figure 2.

Figure 5 is a cross-section on line 5—5 of Figure 3.

Figure 6 is a cross-section on line 6—6 of Figure 3.

Figure 7 is a fragmentary sectional view corresponding to a portion of Figure 2, parts of the mechanism being broken away for clearness of illustration.

Figure 19 is a fragmentary sectional view of the variable displacement pump mechanism, being taken on line 19—19 of Figure 16.

Figure 20 is a detailed sectional view of a constant horsepower control valve, being taken on line 20—20 of Figure 14.

Figure 21 is a fragmentary cross-sectional view of the pump controlling fluid motor, being taken on line 21—21 of Figure 16.

Figure 22 is a detailed view, partly in section, of a limit stop mechanism, looking in the direction of line 22—22 of Figure 16.

Figure 23 is a cross-section on line 23—23 of Figure 22.

Figure 24 is a fragmentary sectional view of an automatic clutch controlling mechanism, taken on line 24—24 of Figure 12.

Figure 25 is a fragmentary sectional view on line 25—25 of Figure 24.

Figure 26 is a fragmentary sectional view taken on line 26—26 of Figure 7.

Figure 28 is a developed view of the torque responsive mechanism shown in Figure 7.

Figure 29 is a fragmentary sectional view taken on line 29—29 of Figure 30 showing the construction of a synchronizing valve.

Figure 30 is an end view of a synchronizing valve shown in section in Figure 29.

Figure 1:
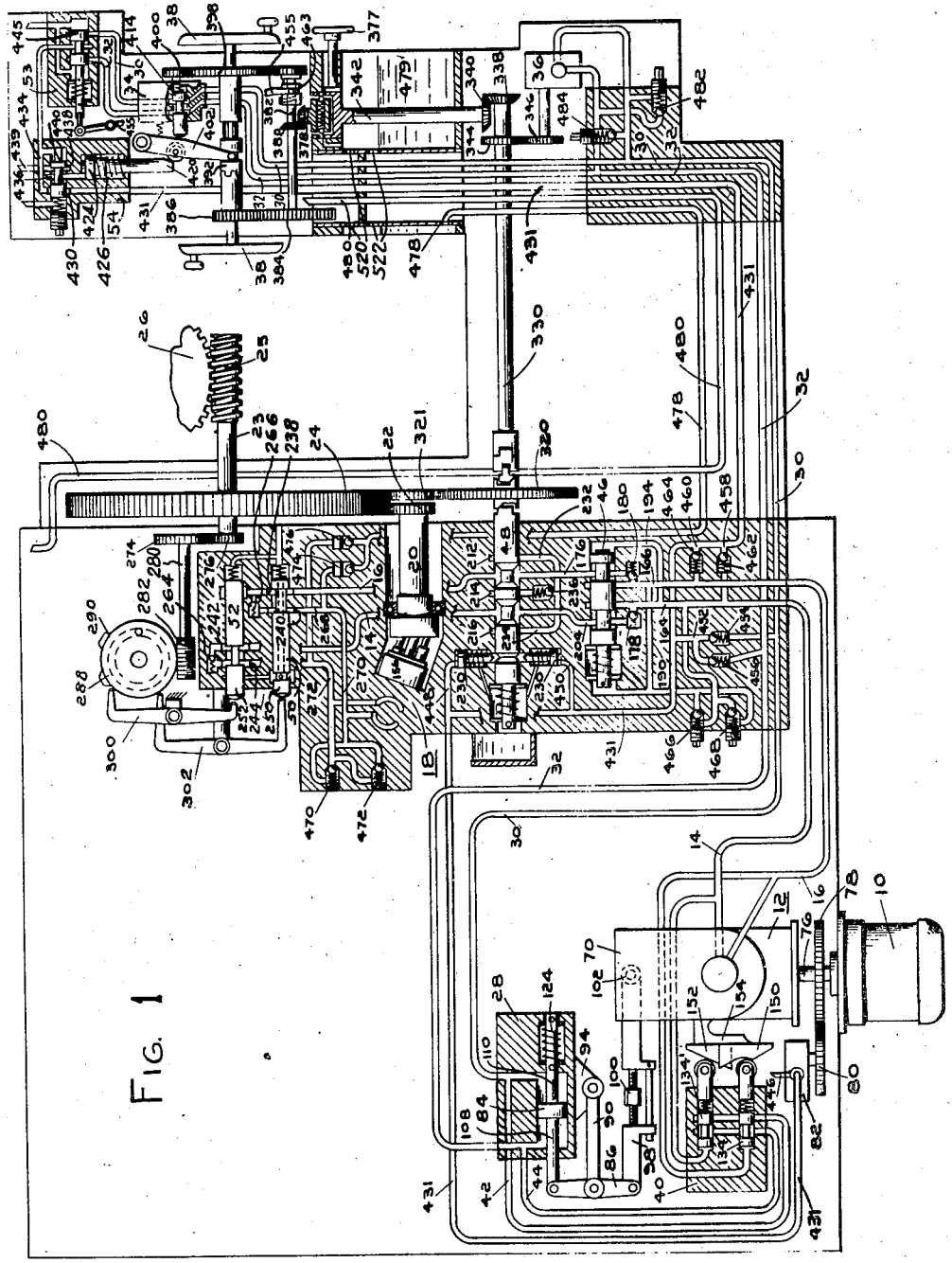
Figure 1 is a diagrammatic view of the hydraulic circuits incorporated in a preferred embodiment of the present invention.

Referring to the drawings, the apparatus is illustrated as a unitary assembly built up of several sections or sub-assemblies which are readily separable for service and repair. These sections when assembled together provide a complete casing for all the internal parts. As shown in Figures 2 and 3 there is provided a main tank unit A carrying a prime mover, pump, hydraulic motor and valve block unit, an auxiliary tank and connector unit B, a horizontal extension unit C, a vertical extension unit D and a control head E.

The mechanism comprises generally a prime mover, such as an electric motor indicated at 10 which is adapted to drive a variable displacement pump 12, connected by main circuit conduits 14 and 16 to a fixed displacement rotary fluid motor 18, these elements constituting a variable speed power-operated driving means. The output shaft 20 of the motor 18 drives through the medium of gears 22—24, shaft 23, and worm 25 a load device indicated diagrammatically at 26. The latter may represent, for example, the rack segment of a rudder stock, or other member, the position of which it is desired to control at will.

The mechanism for controlling the operation of the transmission comprises a novel follow-up control system which operates on the variable stroke pump 12 through a piston and cylinder fluid motor 28 connected by control circuit lines 30 and 32 with a primary control pump 34 and a response pump 36. The pump 34 is adapted to be driven by hand wheels 38, which form the primary controlling member of the device, that is to say, they constitute the means whereby selective control efforts are put into the mechanism at will. The response pump 36 is connected to the load device by means of gearing and shafting connections. The control conduits 30 and 32 connect the pumps 34 and 36 in a parallel circuit with the control motor 28.

Also cooperating with the control motor 28 is a horse-power limiting control system comprising a constant horsepower valve block 40 connected to opposite ends of the motor 28 by conduits 42 and 44, and adapted to take over control of the motor 28 whenever a predetermined horsepower load is exceeded. This mechanism operates in combined response to both pressure in the main circuit lines 14 and 16 and the displacement setting of the pump 12 so that whenever the product of the pressure and the pump displacement tends to exceed a certain value, the pump displacement is reduced to maintain this product at a constant maximum limit.

The main circuit lines 14 and 16 pass through various protective mechanisms, including a pressure responsive anti-kick valve 46, a torque responsive anti-kick valve 48, and a pair of limit stop valves 50 and 52. The pressure responsive anti-kick valve 46 is adapted to control the main circuit in such a manner as to prevent the motor 18 from imposing sudden excessive pressure loads on the pump 12 when any external force applied to the load device tends to cause the motor 18 to run backward. This valve also acts to prevent overrunning of the load device by blocking the return conduit from the motor 18 to the pump 12 whenever the load device 26 tends to overrun.

The torque responsive valve 48 is utilized only during direct drive of the load device 26 from the hand wheels 38, at which time the motor 10 and pump 12 are out of operation. The valve 48 is for the purpose of permitting the motor 18 to pump fluid idly from one side to the other thereof so long as, during this direct manual drive of the load, neither excessive resistance is encountered at the load device 26 nor does the load device tend to overrun.

The limit stop valves 50 and 52 are for the purpose of blocking the return of fluid from the motor 18 when the load device 26 has been moved a predetermined distance in either direction.

Cooperating with the hand wheels 38 there is provided an automatic clutching mechanism indicated at 54 for the purpose of selectively connecting the hand wheels 38 to the direct drive mechanism when the prime mover 10 is out of operation, and at the same time bypassing the primary control pump 34 to permit the latter to bypass fluid idly.

Also cooperating with the hand wheels 38 is a synchronizing valve 53 the purpose of which is to limit the degree of error possible in the relative angular positions of the hand wheels 38 and the load device 26.

The mechanisms above described are incorporated in a unitary sectional casing assembly which is adapted to provide a reservoir for oil as well as to enclose the entire mechanism and provide structural support therefor. This casing assembly is arranged in sections and special provision is made for connecting the various conduits and mechanical driving connections at the joint between sections in an improved and simplified manner. The reservoir arrangements are preferably such that safe operation is permitted and leakage of oil or entrance of air are prevented, even though the main reservoir should become broken or emptied of oil, thus insuring that the protective mechanisms incorporated in the assembly may be maintained effective during hand drive under such conditions.

Referring now to Figures 2 and 3, the pump 12 and motor 18 together with their associated control and safety mechanisms are mounted in a main reservoir casing 56. The motor 10 is secured to one side wall of the casing 56, while the output shaft 23 projects latterly from another side wall of the casing 56. Secured to the casing 56 at the side thereof, adjacent to shaft 23, is a latterly extending casing member 58 which contains a plurality of conduits and a driving shaft (see Fig. 4). The casing member 58 is secured to the casing 56 at a flange connection 60, suitable bolts or other securing means, not shown, being provided for removably securing the members 56 and 58 together. The member 58 has an upwardly facing flange portion 62 to which a vertical casing extension 64 is secured by bolts or other means, not shown. The casing 64 also contains a plurality of conduits and a shaft. Mounted at the top end of the casing section 64 is a control head assembly 66 secured to the section 64 at the flange 68.

The casing section 58 contains suitable bevel gearing for connecting the shaft sections together and also contains the response pump 36. The control head 66 contains the primary control pump 34 together with the clutch controlling mechanism 54 and the necessary gearing to establish connection with the shaft contained in the housing section 64.

The variable displacement pump 12 as illustrated in Figure 19 is of the type comprising a swinging yoke 70 pivoted on trunnions 72 which also form the fluid inlet and outlet connections for the pump 12. The pump construction chosen for illustration is generally similar to that shown in patent to Hans Thoma, No. 1,931,969, and per se forms no part of the present invention. Since the operation of these pumps is well known in the art, it is sufficient to state that the quantity and direction of fluid flow through the pump may be selectively varied as desired by swinging the yoke 70 to any suitable position. With the yoke in the position parallel to the pump axis as shown in the drawings, that is, in neutral position, no fluid is pumped. If the yoke be tilted away from neutral on one side, the fluid flow will vary in proportion to the distance which the yoke is moved and will be in a given direction through the pump. If the yoke is tilted on the other side of neutral, the flow is in the opposite direction and of course proportional to the distance away from neutral to which the yoke is swung. The main part of the pump comprises a member 73 which is secured to a flange member 74, the latter being removably secured in an opening in the front wall of the casing member 56 and forming also a support for the motor 10.

The shaft 76 of the pump carries a gear 78 which meshes with a gear 80 adapted to drive an auxiliary pump 82 which is also secured to the flange member 74. The pump 82 may be of any suitable fixed displacement type, such as the well known gear pump, and is for the purpose of forming an auxiliary supply of pressure fluid for operating certain of the control mechanisms. The pumps 12 and 82 are continuously driven by the motor 10 at a constant speed whenever the device is used in its normal power driven method of operation.

Figure 14:
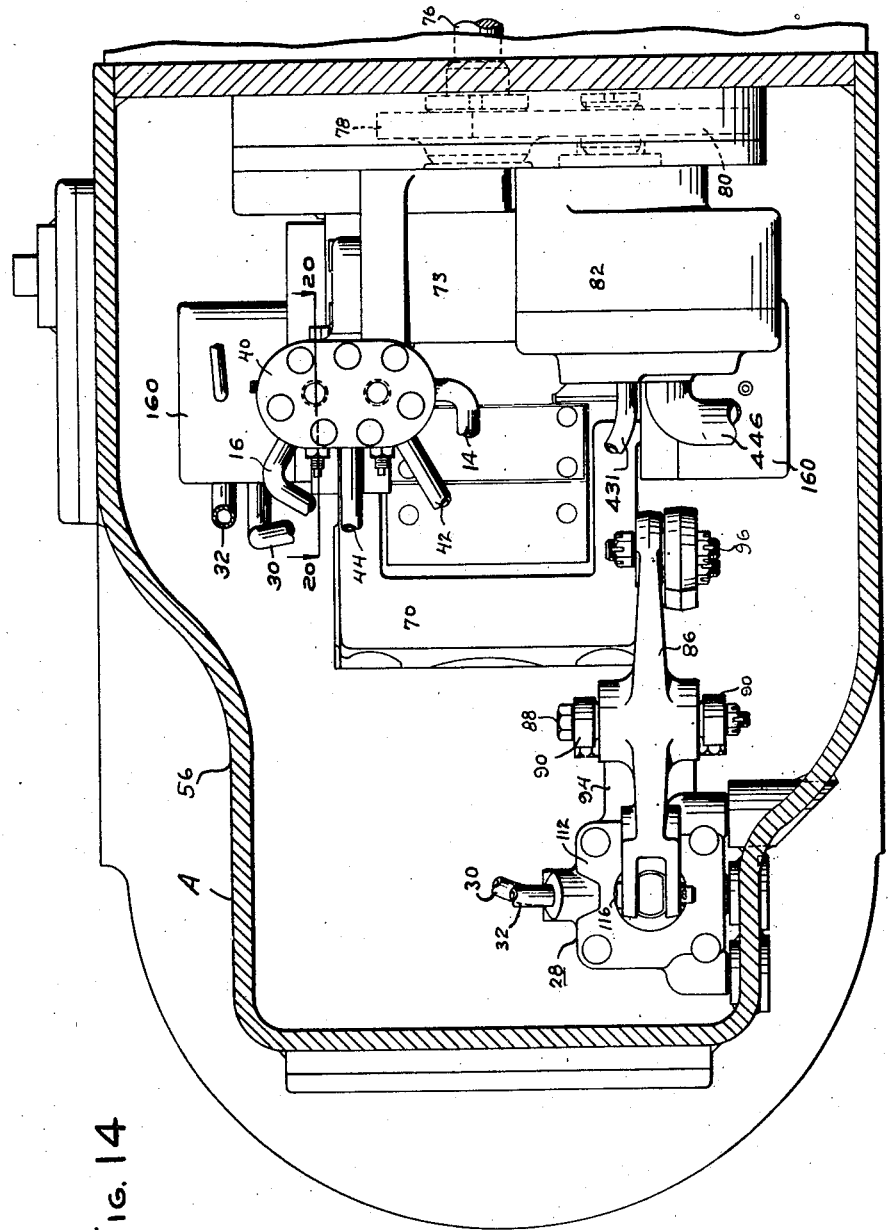
Figure 14 is a fragmentary sectional view taken on line 14—14 of Figure 16.
Figure 16:
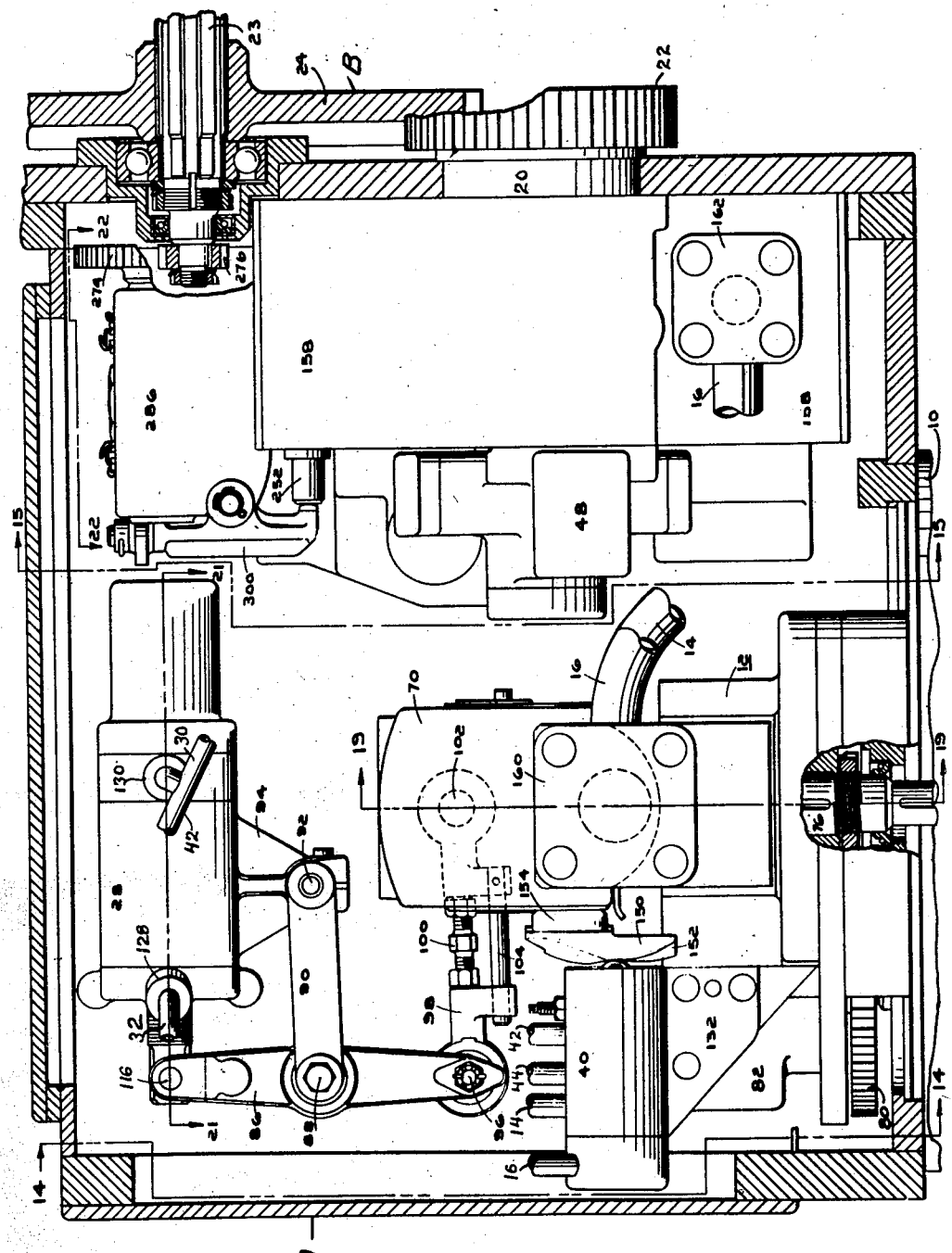
Figure 16 is a fragmentary sectional view, viewed from the top in Figure 2, showing the mechanism inside the main reservoir casing.

Referring now to Figures 14, 16 and 21, the pump yoke is connected to the piston 84 of the control motor 28 by a lever 86 pivoted at 88 to a pair of links 90 in turn pivoted at 92 on a bracket 94 formed on the housing of the motor 28. The opposite end of the lever 86 is pivoted at 96 to a link 98 having a turnbuckle adjustment 100 and having its opposite end pivoted at 102 to the yoke 70. A suitable sliding brace rod 104 is secured to the righthand portion of the link 98 and slidably engaged with the lefthand portion thereof to provide additional columnar stiffness to the link 98 adjacent to the turnbuckle section 100.

The piston 84 of the motor 28 is slidably mounted in a cylinder 106 and has stems 108 and 110 projecting through the end caps 112 and 114 which close the opposite ends of the cylinder 106. The stem 108 is pivotally connected to the lever 86 at 116, while the stem 110 has a reduced portion 118 on which spring abutments 120 and 122 are slidably mounted. A centering spring 124 is positioned between the spring abutments, while the latter are enclosed in a housing member 126 secured to the cap 114. The arrangement is such that the spring 124 constantly tends to bring the piston 84 to its central position illustrated regardless of whether the latter be moved to the right or left thereof. Connections 128 and 130 are formed in the end caps 112 and 114 whereby the control conduits 32 and 30 are connected to the opposite ends of cylinder 106.

Secured on a bracket 132 mounted on the pump housing member 72 is the constant horsepower valve block 40. This block contains two identical horsepower limiting valves, the construction of which is illustrated in Figure 20. The valve proper comprising a spool 134 slidably mounted in a bore 136 and normally urged to the left in Figure 20 by a spring 138. Annular ports 140 and 142 are formed in the bore 136 and are cut off from communication with each other when the spool 134 lies in its lefthand position illustrated. The ports 140 and 142 are connected to the conduits 42 and 44 which communicate respectively with opposite ends of the cylinder 106. Whenever the spool 134 is moved to the right, communication is established by the ports 140 and 142, thus bypassing opposite ends of the cylinder 106 and permitting the centering spring 124 to move the piston 84 toward neutral position so long as this bypass path is open. Abutting the spool 134 on its left hand end is a small piston 135, subject to pressure in one of the main circuit conduits 14 or 16, which pressure is resisted by the spring 138. The degree of compression of spring 138 is varied automatically in accordance with the position of the yoke 70 by means of a plunger 144 slidably mounted in the bore 136 and abutting the right hand end of the spring 138. A suitable stop pin 146 prevents the plunger 144 from moving entirely out of the bore 136. A roller 148 carried by the plunger 144 is adapted to contact one of two cams 150 and 152 carried by a bracket 154 secured to the yoke 70 (see Figure 16). The cams 150 and 152 are so shaped that the adjustment of spring 138 is varied in the correct manner to provide for opening of the bypass 140–142 whenever the product of pressure in the main circuit and displacement of the yoke 70 away from neutral equals a predetermined value. Thus, as the yoke 70 approaches neutral position, the plunger 144 is moved inwardly to the farthest extent, thus requiring a high pressure on the lefthand end of the spool 134 before the valve opens. As the yoke moves away from neutral position, the plunger 144 is permitted to recede out of the bore 136, and thus permit the valve 134 to open at progressively lower pressures as the pump displacement is increased. This relation between the pump displacement and system pressure is preferably not a linear one but approaches a hyperbolic relationship, suitable departure from a true hyperbolic relation being preferably introduced to compensate for variations in transmission efficiency.

Referring now to Figures 7 and 15 through 18, the fluid motor 18 is of generally similar construction to the pump 12 except that a fixed angle yoke member 156 is provided in place of the swinging yoke 70. The motor parts together with certain of the protective valve mechanisms are all mounted in a unitary block 158 which is mounted on one side wall of the reservoir 56.

The main circuit conduits 14 and 16 connect from the flange connections 160 at the trunnions 72 of the pump to similar flange connections 162 on the top and bottom of the block 158. Bores 164 and 166 communicate from the connection flanges 162 to ports 168 and 170 of the pressure responsive anti-kick valve 46. The latter is formed in a transverse bore 172 in the block 158 and has an additional pair of ports 174 and 176 spaced from the ports 168 and 170. The port 174 communicates with the discharge side of a check valve 178 open to free flow from the bore 164; while the port 176 connects to the discharge side of a check valve 180 opening to free flow from the bore 166. Within the bore 172 is positioned a spool 182 having a central land 184 normally closing the ports 168 and 170. At its two ends the spool 182 is provided with piston heads 186 and 188 which are subject to pressure in the conduit 14 and 16 respectively. For this purpose, a passage 190 communicates between the bore 166 and the lefthand end of the bore 172 which is enclosed in a cap member 192. A passage 194 formed in block 158 communicates with a groove 196 formed in a plate 198 which forms the supporting means for block 158 and forms also the wall of the reservoir casing 56. The right hand end of the bore 172 is thus placed in communication with the bore 164. A centering spring 198 together with spring abutments 200 and 202 normally maintains the valve spool 182 in a central position, but permits the latter to move to the right when the conduit 16 is the pressure conduit, and to move to the left when the conduit 14 is the pressure conduit.

Figure 18:
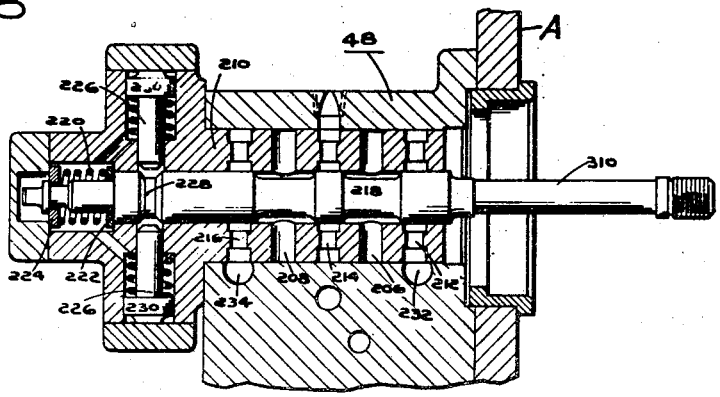
Figure 18 is a fragmentary sectional view of a torque responsive valve, being taken on line 18—18 of Figure 15.

The port 176 and a port 204 in line with the port 174 provide communication to the torque responsive anti-kick valve 48 which is shown in section in Figure 18. The port 176 communicates with a port 206, while the port 204 communicates with a port 208 in the body member 210 of the valve 48. The latter also has three additional ports 212, 214, and 216 which are normally closed by the spool 218 when the latter is in its central position illustrated. The spool 218 is normally biased to central position by a centering spring 220 and abutment washers 222 and 224 and is adapted to be moved to the right or left when torque is applied in one direction or the other to drive the load device 26 directly from the hand wheels 38. The mechanism for accomplishing this movement will be later described.

Suitable lockout plungers 226 are adapted to engage a groove 228 whenever fluid pressure is admitted to the end faces of pistons 230. The latter are normally spring biased outwardly to the position shown in Figure 18. The ports 212 and 216 communicate by bores 232 and 234 with the entrance side of a check valve 236 as shown in Figure 1, the outlet side of this check valve communicating with the port 214.

Figure 17:
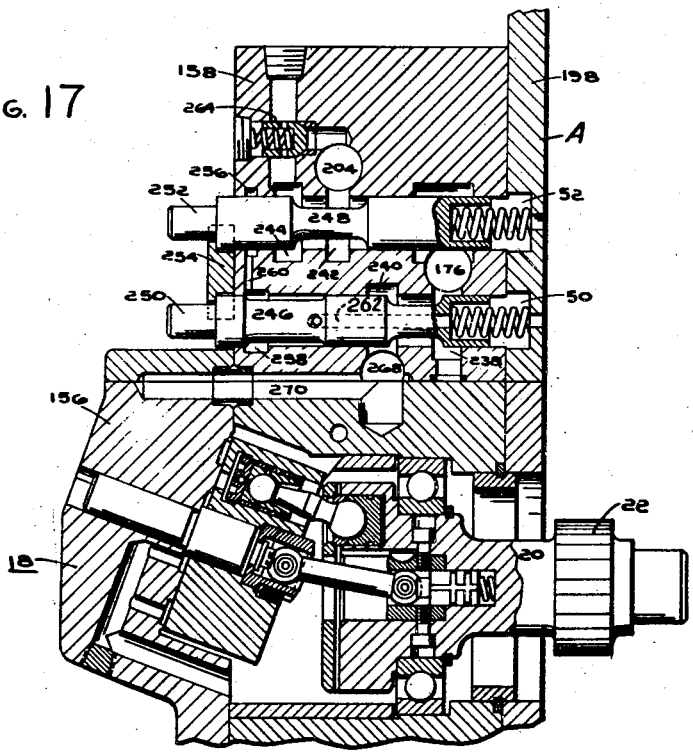
Figure 17 is a fragmentary sectional view through the fluid motor and control block, taken on line 17—17 of Figure 15.

The ports 176 and 204 also communicate with the limit stop valves 50 and 52 respectively shown in Fig. 17. These valves comprise a pair of normally connected ports 238 and 240 at the valve 50 and a similar pair of normally connected ports 242 and 244 at the valve 52. Spools 246 and 248 are normally spring biased to the left in Figure 17 and have projecting stems 250 and 252 which, when depressed, cut off communication between the two ports in the respective valves. A stop block 254 is provided for limiting leftward movement of the valve spools 246 and 248. Suitable leakage collecting grooves 256 and 258 are provided adjacent the projecting stem ends of the valve spools and are connected by a passage 260. The groove 258 communicates by a passage 262 formed in the valve spool 246 with the space at the right hand end of the spool which later opens to the righthand face of the plate 198.

A check valve 264 connects the ports 242 and 244 of valve 52 for free flow from the port 242 to the port 244 when the valve 52 is closed. A similar check valve not shown in Figure 17 but indicated at 266 in Figure 1 provides for free flow from port 238 to port 240 when the valve 50 is closed. The port 240 communicates by a bore 268 and passage 270 with one side of the motor 18, while a corresponding passage not shown in Figure 17 but indicated at 272 in Figure 1 connects the port 244 with the other side of the motor 18.

The valve block 158 also contains various relief, check, and replenishing valves shown in Figure 1 and not illustrated in detail in the sectional views of the valve block 158, these valves being described in connection with their cooperating circuit portions hereafter.

Figure 15:
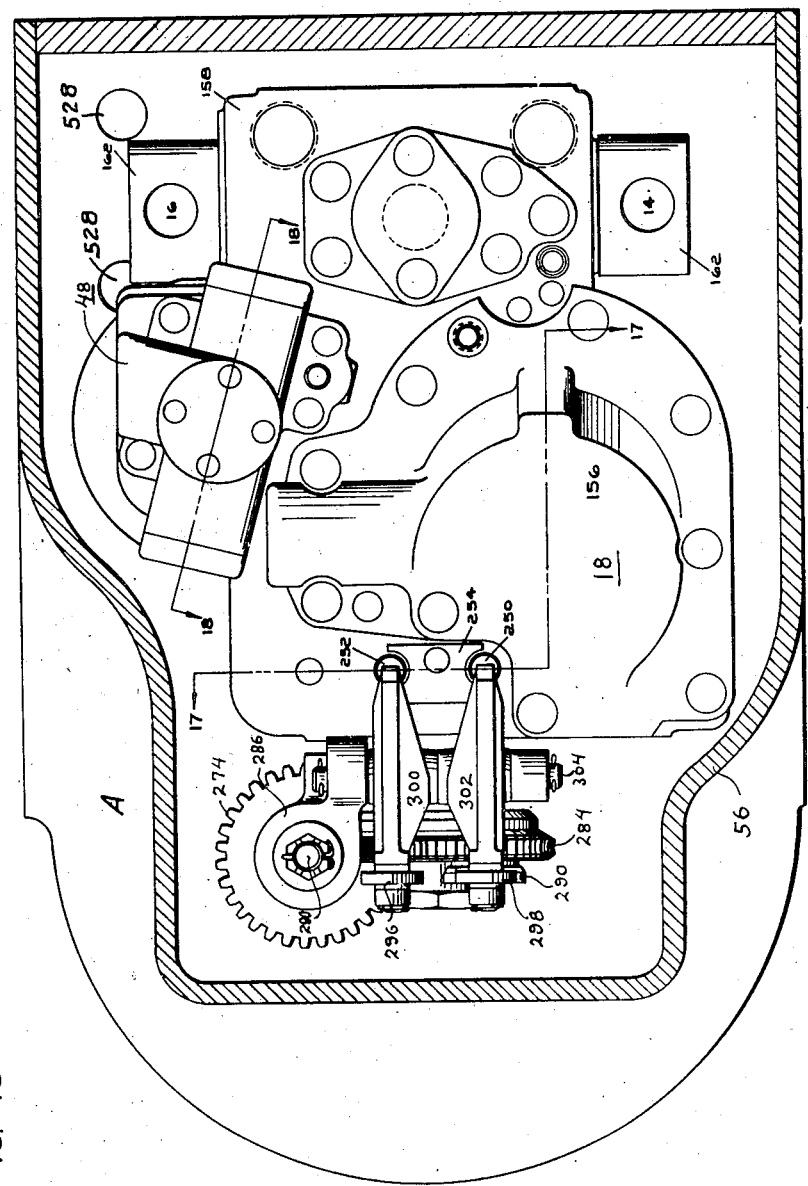
Figure 15 is a fragmentary sectional view on line 15—15 of Figure 16.

The mechanism for operating the limit stop valve 50 and 52 is illustrated in Figures 15, 22 and 23. This may comprise a gear 274 meshing with a pinion 276 on the output shaft 23 of the unit. The gear 274 is secured to a shaft 280, having a worm 282 which meshes with a worm wheel 284. The shaft 280 and the worm wheel 284 are pivoted on a bracket 286 secured to the block 158 (see Figure 15). The worm wheel 284 carries adjustably mounted thereon a pair of cams 288 and 290 which are secured by bolts 292 slidable in a circular T slot 294. The cams 288 and 290 are adapted to co-act with rollers 296 and 298 which are carried by levers 300 and 302 respectively. The levers 300 and 302 are pivoted on a stationary shaft 304 secured in the bracket 286. Each of the levers 300 and 302 is provided with a stop lug 306 normally abutting the bracket 286 and with an operating finger 308 adapted to abut the corresponding stem 250 or 252 of the valves 50 and 52 respectively. The gear ratio from the shaft 278 to the worm wheel 284 is such that the desired number of revolutions of the shaft 23 are accomplished in moving the wheel 284 from the position with cam 288 beneath the roller 296 to the position with cam 290 beneath the roller 298. This distance is subject to adjustment at will by adjusting the angular positions of the cams 288 and 290.

The mechanism for actuating the torque responsive anti-kick valve 48 is illustrated at Figures 7 and 28. The stem 310 of the spool 218 has rotatably mounted thereon a pair of cam sleeves 312 and 314 which are non-rotatably tongued together at 316. Surrounding the cam sleeves 312 and 314 is a mating cam sleeve 318 upon which a gear 320 is keyed. The gear 320 meshes with a pinion 321 meshing with the gear 24 as shown in Figure 1. The cam sleeve 312 is provided with a cam face at 322 engaging a corresponding face on the left end of sleeve 318, while the cam sleeve 314 is provided with a cam face at 324 engaging with a corresponding cam face on the right hand end of the sleeve 318. These cam surfaces are of helical form, such that upon relative rotary motion between the two cams 312 and 314 on the one hand and the cam sleeve 318 on the other hand, that an axial movement will be imparted to the sleeves 312 and 314 to the left or right in Figure 7, depending on in which direction the relative rotary movement takes place. Preferably this axial movement imparted to the stem 310 takes place within a few degrees rotation of the sleeves 312 and 314 relative to the sleeve 318. The sleeves 312 and 314 are non-rotatably but slidably connected with a member 326 by means of a tongue connection at 328. The member 326 is in turn coupled to a shaft 330 by a tongue connection at 332 to form an Oldham's connection. A stop plug 333 is secured to the shaft 330 to retain the member 326 in engagement with shaft 330.

The shaft 330 is connected to the hand wheels 38, as will later be described, and forms an auxiliary direct drive for the load device 26 through the torque responsive cam mechanism just described and through the gear 320 and pinion 321. The shaft 330 is journaled in the casing section 58 on bearings 334 and 336. A bevel gear 338 is mounted on the shaft 330 and meshes with a bevel gear 340 (see Figure 26) journaled in the top part casing section 58. The shaft 330 also has keyed thereto a spur gear 344 meshing with a spur gear 346 keyed to the driving shaft 348 of the response pump 36. A shaft 342, see Figure 5, is floatingly mounted by means of splines in a sleeve 352 at its upper end and is adapted to enter the hub 350 of the bevel gear 340 when the casing section 64 is attached to section 58. The hub 350 is journaled on anti-friction bearings 354 mounted in a cage 356 removably secured in the casing section 58. The sleeve 352 is mounted on anti-friction bearings 358 secured in the upper end of the casing section 64. An oil seal 360 is mounted adjacent the lower end of the shaft 342 in the vertical casing section 64.

Figure 9:
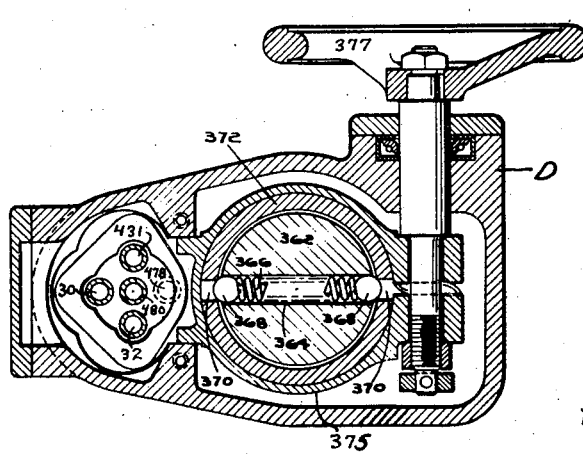
Figure 9 is a cross section of line 9—9 of Figure 8.
Figure 10:
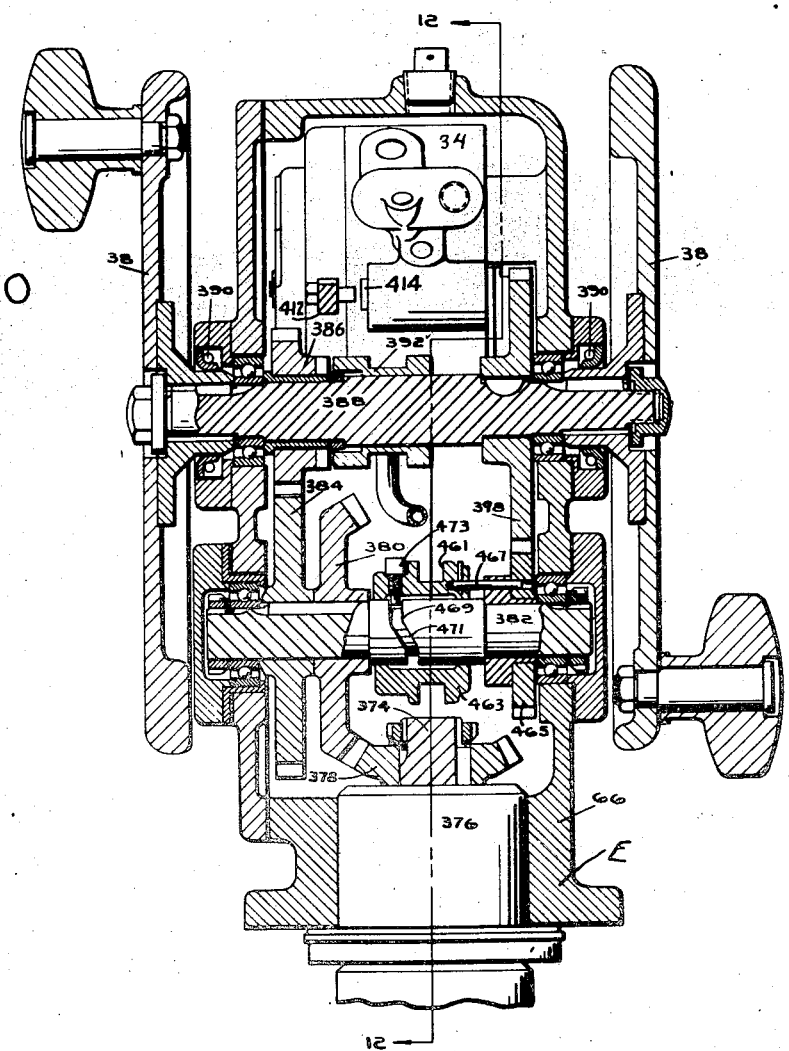
Figure 10 is a cross-sectional view of the upper end of the control standard, viewed in the same direction as Figure 2, and being taken on line 10—10 of Figure 12.
Figure 11:
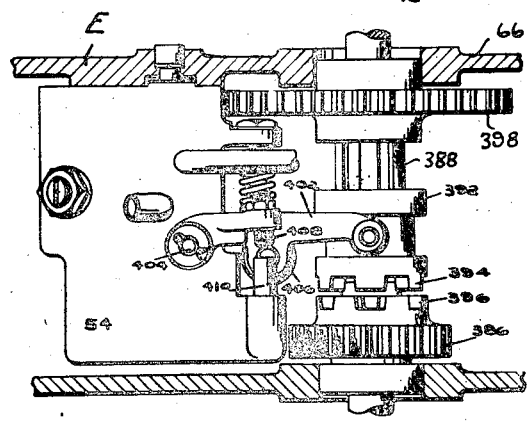
Figure 11 is a fragmentary sectional view on line 11—11 of Figure 12.

The sleeve member 352 carries a hub 362 (see Figure 9) having a transverse bore 364 in which is mounted a spring 366 normally urging a pair of balls 368 outwardly. The latter normally repose in holes 370 formed in a cup-like member 372 co-axial with the hub 362 and surrounding the same. The member 372 has an upwardy extending shaft 374 journaled in a bearing cup 376 slidably retained in the control head housing 66 (see Figure 10). The balls 368 and associated mechanism are adapted to form a yielding clutch between the shafts 342 and 374, thus limiting the torque which may be transmitted therebetween. A brake band 375 encircles the cup 372 and may be tightened by a handwheel 377 in order to lock the handwheels against idle movement when the unit is out of operation.

The shaft 374 carries a bevel gear 378 which meshes with a bevel gear 380 keyed on a transverse shaft 382 journaled on anti-friction bearings in the housing 66. A spur gear 384 is also keyed to the shaft 382 and meshes with a pinion 386 rotatably journaled on a shaft 388. The latter is journaled in the housing 66 and carries the hand wheels 38 at its opposite ends, suitable oil seals 390 being provided at the hubs of the wheels 38.

Figure 12:
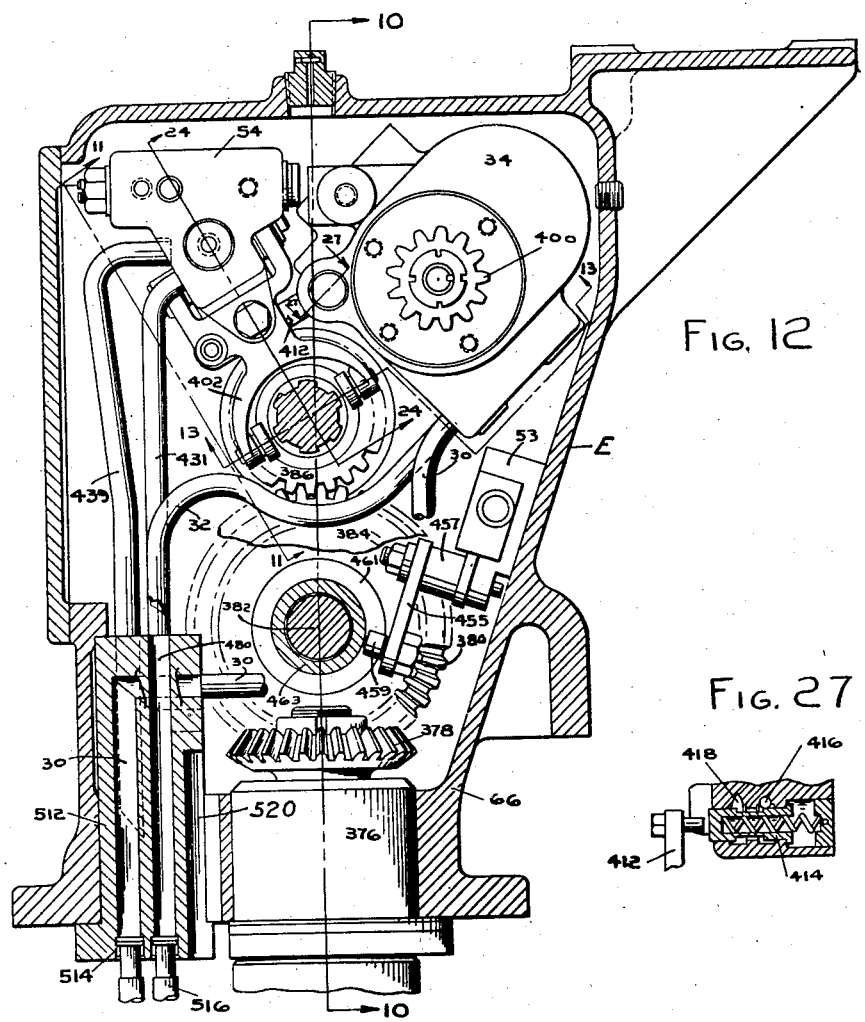
Figure 12 is a fragmentary sectional view on line 12—12 of Figure 10.

The intermediate section of the shaft 388 is splined to carry slidably but non-rotatably a clutch collar 392 having jaws 394 meshing with corresponding clutch jaws 396 formed integrally with the hub of the pinion 386. The shaft 388 also has keyed thereto a spur gear 398 which meshes with a pinion 400 (see Figure 12) keyed to the shaft of the primary control pump 34. The clutch collar 392 is adapted to be shifted by a shifter fork 402 pivoted at 404 on the clutch control block 54 and carrying a roller 406 at its mid-portion. The shifter fork 402 also carries an adjustable stop screw 408 adapted to abut a stop lug 410 secured to the clutch control block 54.

Figure 27:
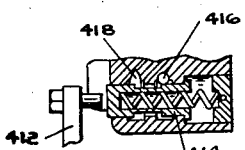
Figure 27 is a fragmentary cross-sectional view on line 27—27 of Figure 12.
Figure 13:
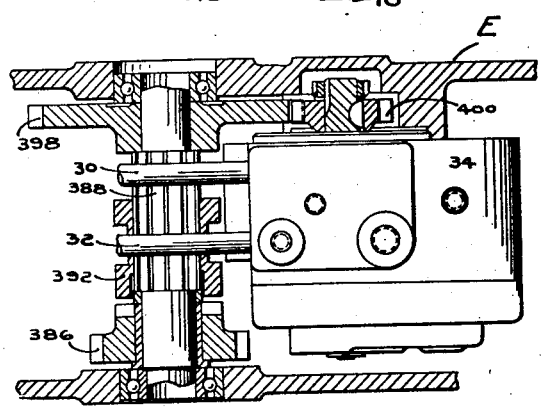
Figure 13 is a fragmentary sectional view on line 13—13 of Figure 12.

The shifter fork 402 carries a projecting arm 412 (see Figures 10, 12 and 27) adapted to abut a bypass valve for the primary control pump 34. This valve is illustrated in Figure 27 from which it will be seen that the spool 414 in its spring-urged position to the left opens communication between the pair of ports 416 and 418 which connect to the two sides of the pump 34. When the spool 414 is moved to the right by the arm 412, this bypass is closed. Viewed in Figure 10, the bypass valve is opened when the arm 412 moves to the left, while it is closed when the arm 412 moves to the right.

For actuating the shifter 402, the clutch control block 54 contains a plunger 420 (see Figure 24) having a cam surface 422 adapted to cooperate with the roller 406. The plunger 420 is controlled by a piston 424 sliding in a cylinder 426 and spring biased upwardly in Figure 24 by a spring 428.

The block 54 also contains a combined relief valve and bypass valve for the cylinder 426, this valve being illustrated in Figure 25. A port 430 communicates with a conduit 431 (see Figure 1) leading from the auxiliary pump 82 and also communicates with the righthand end of the bore 432 through a conduit 434. An intermediate port 436 communicates with the cylinder 426 while a second intermediate port 438 communicates with the interior of the casing 66 through a pipe 439. The spool 440 is biased to the right by a spring 442 adjustable by means of a screw 444 and is urged to the left by the pressure from the auxiliary pump 82 exerted in the righthand end of the bore 432. The spool 440, when a predetermined pressure in the conduit 431 is exceeded, moves to the left to permit pressure oil from the conduit 434 to relieve to the interior of the housing through the port 438. When the valve 440 is in its righthand position when there is no pressure in passage 434, communication is established between port 436 and port 438 thus venting the clutch cylinder 426. As soon as pressure is established in the conduit 434 and the valve moves slightly to the left, this communication is cut out and port 436 is connected to port 430 thus admitting auxiliary pressure oil to the cylinder 426. The parts are shown in Figures 24 and 25 in the latter position.

The synchronizing valve mechanism 53 comprises a double three-way valve 445 (Figures 29 and 30) having ports 447 connected to the follow-up control conduits 30 and 32. The valve 445 is constructed to selectively connect one of the ports 447 with a replenishing oil port 449 and the other to the casing interior or vice versa. The ports 449 are supplied with oil from auxiliary pump 82 through a port 518 which connects to the conduit 434 in valve block 54. The valve 445 is normally spring centered by the spring 451 and spring abutments 453 and it may be moved to the left or right by a lever 455 pivoted at 457 on the valve block 53. The lever 455 carries a pin 459 which rides in a groove 461 (Figure 10) formed in a sleeve 463 freely rotatable on shaft 382. The sleeve 463 is non-rotatably but slidably connected to a pinion 465 by pins 467. Pinion 465 meshes with gear 398 on shaft 388 so that sleeve 463 is thus caused to rotate with hand wheels 38 but is permitted a certain amount of axial sliding movement on shaft 382. The latter is provided with a groove 469 having a helical portion 471. A pin 473 is threaded in sleeve 465 and projects into the groove 469, normally resting in the mid-portion of the helical portion 471, although shown 90° away from that position for clearness of illustration. The mechanism just described constitutes the equivalent of a screw and nut differential mechanism connecting the shaft 382 which moves with the load device, the pinion 465 which moves with the hand wheels, and the lever 455 which controls the valve 445.

The various units are connected together hydraulically as illustrated in the circuit diagram of Figure 1. Besides the main circuits 14 and 16 connecting the pump 12 with the motor 18 and passing through the protective valves 46, 48, 50, and 52, there is the follow-up control circuit comprising the conduits 30 and 32 which connect primary control pump 34, the response pump 36, and the control fluid motor 28 in a parallel circuit. Also in parallel with this circuit through the conduits 42 and 44 are the constant horsepower valves 134 and 134' in the block 40. The auxiliary pump 82 has a suction conduit 446 through which oil is withdrawn from the reservoir 56 and the delivery conduit 431 which terminates in the clutch control block 54 as previously described. The conduit 431 has branches 448 and 450 connecting to the lockout pistons 230 whereby the latter are projected inwardly whenever pressure exists in the conduit 431. The conduit 431 has also a two-arm branch 452 which communicates by check valves 454 and 456 with the follow up control conduits 30 and 32 respectively. Other branches 458 and 460 contain check valves 462 and 464 communicating with the main line conduits 14 and 16 respectively. Suitable pressure relief valves for the main circuit are provided on the pump side of the protective valves at 466 and 468 and on the motor side thereof at 470 and 472.

Gravity replenishing valves are also provided for the motor end of the main circuit at 474 and 476 which admit fluid under gravity head from a conduit 478 communicating with an auxiliary reservoir 479 formed by the casing section 64. A pressure equalizing conduit 480 communicates between the upper end of the reservoir 56 and the interior of the control head housing 66. The relief valves for the follow-up control circuit lines 30 and 32 are provided adjacent the response pumps 36 at 484 and 482.

Referring to Figures 4 and 7 it will be seen that the housing section 58 is attachable to and removable from the housing section 56 by the mere act of securing the two parts together at the flange 60. The conduits 30, 32, 431, 478 and 480 are formed in the section 58 by a plurality of grouped tubes indicated at 488 in Figure 7. These tubes are suitably secured in a manifold block 486 as by welding therein, the block having a plurality of recesses 490 in line with the tubes and opening to the adjacent face of the casing member 56. A connection block 492 is secured to the plate 198 on the opposite side from the motor and control valve block 158 and has a plurality of bores 494 forming continuations of the conduits embraced in the tubes 488. The end of the block 492 adjacent the block 486 is provided with counterbores 496 similar to the bores 490. Positioned within the bores 490 and 496 are a plurality of coupling sleeves 498 which are provided with beaded ends which are a slight press fit in the bores 490 and 496 respectively.

The sleeves 498 provide a fluid-tight seal joint for each conduit in the section 488 with the corresponding bore 494. This connection is made by a simple axial movement bringing the parts together and is independent of reasonable variations in the distance at which the sleeves 498 are inserted in the bores 490 and 496. Since the sleeves are supported against expansive forces only at the beaded ends, it will be seen that as the pressure rises, the sleeve tends to assume a barrel shape, thus more tightly sealing with the walls of the bore.

The shaft 330 carries the coupling member 326 which is engageable with the tongue 328 by a straight axial movement; thus the housing section 58 may be assembled to the housing section 56 by merely securing the bolts, not shown, which hold the flange portion against the flange 60 of the housing 56. In so doing, a driving connection is established at the coupling 326 and the group of conduits 488 are individually connected to the corresponding bores 494.

At their righthand ends, the tubes 488 are provided with integral beaded portions 500 engageable in bores 502 formed in the response pump block 36. The conduits leading from the block 36 to the control head housing are similarly formed by a group of tubes 504 which are connected to the block 36 in the same manner as the tubes 488. The tubes 504 (see Figure 26) are secured by welding to a manifold block 506 in the upper part of the housing 58.

Figure 8:
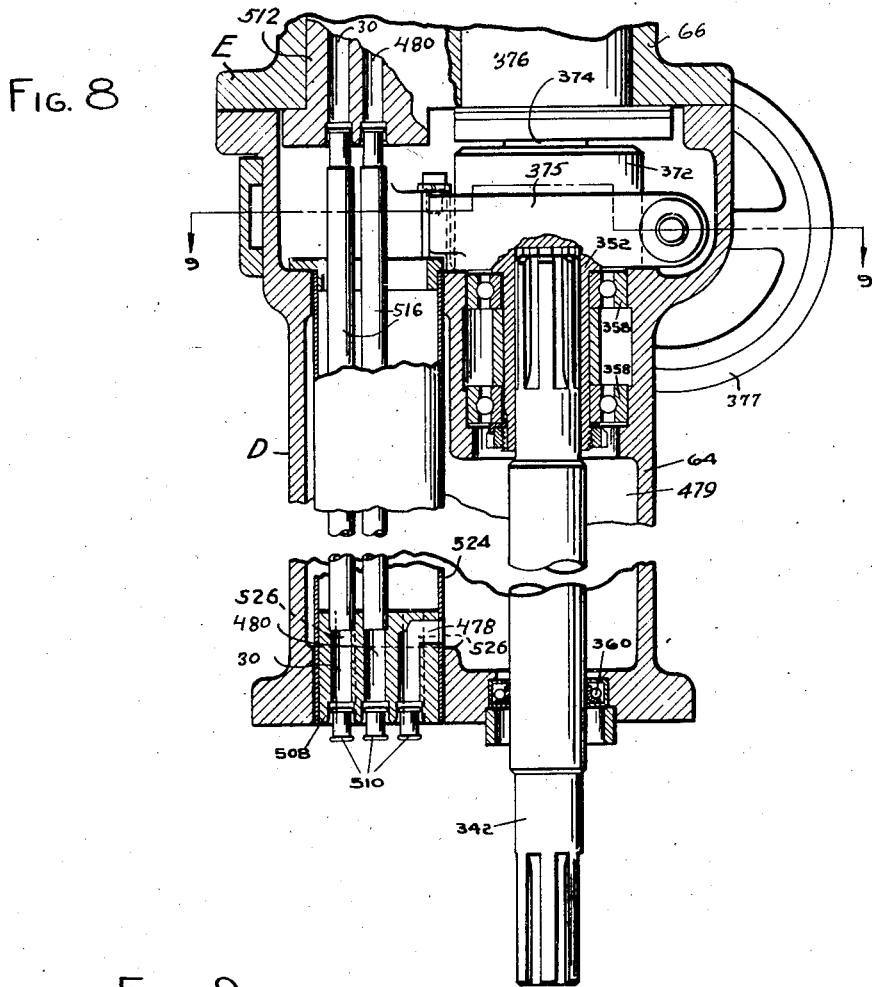
Figure 8 is a fragmentary sectional view of a portion of the mechanism corresponding to Figure 2, certain of the parts being broken away for clearness.

Referring to Figure 8, the conduits continue in the vertical casing section 64 through a block 508, coupling sleeves 510 being provided to connect the block 506 to the block 508. The shaft 342 being splined in the hub 350, the upper section 64 may be assembled to the housing section 58 by an axial movement, the securing of the bolts at the flange connection serving to establish the conduit and shaft connections in addition to securing the two housing portions together.

The control head housing is provided with a conduit block 512 (Figure 12) having bores 514 engageable with the beaded upper ends of the conduit tubes 516 which are welded in the upper end of block 508. The bearing cup 376 being slidable in the housing 66 and the bevel gear 378 being no greater in diameter than the bearing 376, the head 66 may be assembled onto the top of the vertical casing 64 in the same manner as the other casings are assembled together.

In operation, using the prime mover 10 as a source of power and the hand wheels 38 as the primary controlling elements with the motor 10 in operation, oil will be delivered by the auxiliary pump 82 into the conduit 431, and pressure will build up therein to the value at which the relief valve 440 opens. This pressure is more than sufficient to overcome the spring bias of the lockout plunger pistons 230 and project the same inwardly to block the torque responsive anti-kick valve 48 in central position. Should any replenishing fluid be required in the control circuit 30—32 or in the main circuit 14—16, the corresponding replenishing valves 454—456—458—460 will open until the pressure in each of these conduits equals the pressure in conduit 431.

As the relief valve 440 moves to the left, it cuts off the clutch cylinder 426 from the tank connection 439 and opens it to the conduit 431, thus admitting fluid to advance the plunger 420. The clutch shifter lever 402 accordingly moves to the right in Figure 1 disengaging the hand wheel shaft from the pinion 386. The bypass valve 414 is also moved to the right, closing the bypass around the primary control pump 34. The circuit is thus automatically placed in condition for follow-up control as soon as the prime mover 10 is started and the pump 82 has built up sufficient pressure to start the valve 440 to the left.

With the pump yoke 70 in neutral position, the pump 12 turns idly without delivering fluid to either conduit 14 or 16. If now the hand wheels 38 are turned in one direction, say, top toward observer, the control pump 34 will deliver fluid into one of the conduits, 30 for example, and since the response pump 36 is maintained stationary for the moment by its connection to the load device 26, this fluid will be delivered to the right end of the control motor 28, thus throwing the pump yoke 70 on stroke to the right to cause delivery of fluid through line 16 to the motor 18 and consequent rotation of the load device 26 in the desired counterclockwise direction. Check valve 180 permits this flow to pass freely from line 16 to port 176 and, as soon as pressure builds up in lines 16 and 196, valve 46 will shift to the right, opening the return path from the motor 18 through line 14 and port 204, which path was previously blocked by check valve 178. The lockout plungers 230 being held in by pressure from pump 82 through line 431, the valve 48 remains in its central position permitting free flow through conduits 14 and 16 in either direction. As soon as this rotation starts, the pump 36 is turned correspondingly and acts to withdraw fluid from the conduit 30 into which the pump 34 is pumping fluid. Thus the motor 28 remains stationary so long as the handwheels continue to be turned at the same rate of speed because the same quantity of oil is withdrawn by pump 36 out of conduit 30 as pump 34 delivers into it (both the hand wheels 38 and the output shaft 20 being driven at corresponding speeds). For this purpose the volumetric capacities of pumps 34 and 36 and the ratios of their drive gearing are properly selected to produce equal fluid displacements per unit of time when the hand wheels and output shafts turn at corresponding speeds (that is, gear 465 (Figure 10) turns at the same speed and direction as gear 380). As soon as they are stopped, the continued rotation of the load device drives the response pump 36 delivering fluid to the left end of the motor 28 and returning the yoke 70 to neutral position. When this position is reached, the response pump stops turning due to stoppage of the load device 26. The elements connected to the conduits 30 and 32 thus comprise a follow-up control system in which the stroke of the pump 12 is made dependent upon the difference in angular position between the hand wheels 38 and the load device 26.

Should the hand wheels 38 tend to depart from synchronized position with the load device 26, that is, beyond the amount necessary to operate the stroke regulating motor 28, due to leakage from any part of the circuit 30—32 or to other causes; the synchronizing valve 53 will be actuated by the differential mechanism at sleeve 463. When this error exceeds a certain limit determined by the gear and leverage ratios of the mechanism, valve 445 shifts to the left or right as required and after a predetermined movement as determined by the overlap in the valve opens one of the ports 447 to one of the ports 449. Fluid from the auxiliary pump 82 is thus admitted to whichever of the control conduits 30 or 32 requires more oil in order to bring about synchronism. At the same time the other port 447 is opened to the interior of the casing thus exhausting oil from the other control line. This synchronizing action terminates as soon as the load device 26 has been moved sufficiently to bring the valve 445 back to closed position. In this connection the term "synchronize" and its derivatives is used herein and in the claims to indicate such action as will cause the position of the load device to correspond to the position of the hand wheels as if they were mechanically connected irrespective of whether the speed ratio of such connection be one to one or some other ratio.

During operation in this manner, the motor 10 is constantly protected against overload by the constant horsepower valves 134 and 134' which act in the manner previously described to prevent the product of pressure in the lines 14 or 16 and stroke of the pump 12 from exceeding a predetermined value which will not overload the prime mover 10. Thus a steady resistance at the load device 26 which is too great to be overcome at full speed will be overcome at the greatest lower speed which the horsepower capacity of the motor 10 will permit. During operation under such overload conditions, the conduits 30 and 32 are bypassed through one of the valves in the block 40, thus permitting the operator to continue to turn the hand wheels 38 without adverse effect on the mechanism.

Should a sudden resistance be encountered at the load device 26 tending to move the same, for example, clockwise, in opposition to its intended direction of movement while the yoke 70 is on stroke to the right, the check valve 180 will prevent back flow to the pump 12 through line 16, while if the sudden applied resistance is sufficient to actually slow down the motor 18 or turn it backwardly, the corresponding relief valve 472 will limit the pressure in the motor side of the circuit to a safe value not injurious to the motor 18. It will be noted that whenever any significant resisting pressure exists in one of the main circuit conduits 16, for example, the anti-kick valve 46 moves to the right. During such sudden resisting overloads, the valve remains in its shifted position, and the check valve 180 acts to prevent back flow in the pressure line in the event the pump relief valve 466 should open. Should the load device 26 be subjected to a sudden external counterclockwise force causing the same to overrun its normal drive by the motor 18, the first thing that happens is that the pressure in the main circuit first becomes equalized and then reverses, that is, it shifts to the line 14 in which fluid is returning from the motor to the pump. This equalization of pressure causes the valve 46 to return to central position in which the return line 14 is blocked, so that it is impossible for the motor 18 to overrun the pump 12 except by developing sufficient pressure to open the relief valve 470.

During normal operation intermediate the limiting positions of the load device 26, the limit stop valves 50 and 52 permit free flow around their check valves 266 and 264 in either direction. When one of the limiting positions is reached, say, after counterclockwise movement, the cam 288 causes the valve 52 in the return circuit 14 of the motor to close gradually, thus decelerating the load and eventually stopping the same. With the load thus stopped at its limiting position, it is possible to back the same away at full speed by a reverse operation of the hand wheels 38. Under these conditions, the line 14 which was the return line now becomes the pressure line, and the fluid is permitted to flow in this line to the motor through the check valve 264 at the closed limit stop valve 52.

Should the prime mover 10 become disabled for any reason and it become necessary to operate the load device by hand, the pump 82 being no longer driven, fluid is permitted to exhaust from behind the lockout plungers 230 by leakage, and the valve 440 moves to the right for the same reason. Movement of the latter quickly exhausts the clutch control cylinder 426, thus retracting the plunger 420, and permitting the shifter fork 402 to move to the left to the position of Figure 1. The bypass valve 414 again opens and the hand wheels are now clutched to the pinion 386 which through the gearing and shaft connections previously described connect directly to the load device 26. Preferably the gear ratio between the hand wheels 38 and the load device 26 under these conditions is considerably lower than that during power operation as shown more particularly in Figure 10.

Due to the lockout plungers 230 having been retracted, the torque responsive valve 48 is now free to operate and shifts to the right or left when torque is applied to the hand wheels 38 in one direction or the other. During normal operation, say, with hand wheels 38 being turned top toward observer, the movement of the valve 48 is to the left and opens the bypass through conduit 234 and check valve 236 so that the motor 18 may be turned idly pumping oil into lines 14 and 234 against the negligible resistance of the check valve 236 from which it returns through line 16 to the motor 18.

Should the resisting load become too great and tend to drive the motor 18 reversely, the check valve 236 prevents such flow. The torque limiting clutch 368—370 limits the torque which may be applied by the hand wheels 38, while the check valve 236 acts as a sort of hydraulic ratchet preventing back rotation of the motor 18.

Valve 48 also acts to prevent over running of the motor 18 due to an external force applied to the load device in its intended direction of movement. As soon as such overrunning force, say, tending to drive the load counterclockwise, moves the load device slightly ahead of the corresponding position of the hand wheels 38, the torque responsive mechanism at the valve 48 permits the latter to center, thus blocking the bypass through the check valve 236. With the valve 48 thus centered, the check valve 178 prevents flow of oil out of the motor 18 except at a pressure high enough to open the motor relief valve 470. Should the overrunning force be applied sufficiently to cause the load 26 to get materially ahead of hand wheels 38, the torque responsive mechanism causes the valve 48 to shift beyond center to the right, thus connecting conduit 14, which is still the return conduit from the motor, to the upper side of the check valve 236, which then acts to prevent delivery of fluid from the motor 18 except through the motor relief valve 470.

While the above description of operation of the anti-kick valve 46, limit stop valves 50 and 52 and torque responsive valve 48 has been described in connection with only one direction of operation considered, it will be obvious that their operation is similar under opposite conditions of rotation and oil flow in the main circuit 14—16.

During manual operation by direct drive from the hand wheels 38, the pump 82 is no longer available for replenishing the main circuit lines. For this reason, the auxiliary reservoir 479 in the vertical housing 64 forms a supply of replenishing fluid which is admitted as needed through the conduit 478 and the proper check valve 474 or 476.

Provision is also made for preventing leakage of oil or entrance of air from the parts in the motor block 158 which are utilized during direct hand drive. For this purpose the housing 56 is divided into two parts by the plate 198 which supports the block 158 (see Figure 7). That portion of the housing 56 to the right of the plate 198 forms an auxiliary oil reservoir surrounding the gearing and torque responsive mechanism as well as the motor output shaft 20 and the stem of the valve 48. The chamber at the lefthand end of valve 48 which contains the centering spring 220 is in communication with this auxiliary reservoir through bore channels not shown. The projecting stems of the limit stop valves 50 and 52 are sealed by the grooves 256 and 258 and connecting channels 260 and 262. Thus a supply of oil is maintained for sealing the working parts of the circuit which are utilized during direct drive. The auxiliary reservoir is maintained filled during power operation by the overflow from the relief valve 440, thus insuring that at any time when it is necessary to go over to direct manual drive, there will be an ample supply of oil in the reservoir 479 even though the main reservoir be emptied during hand operation. This overflow of oil from the relief valve 440 also passes down over the mechanism in the upright housing section, providing lubrication of the working parts thereof.

The operation of the auxiliary reservoir system may be traced in detail as follows: With the main reservoir to the left of plate 198 in Figure 7 filled with a substantial quantity of oil and with the motor 10 in operation, the pump 82 delivers auxiliary pressure oil to the various control and replenishing circuits as previously described. The excess oil not used in these circuits is passed over the relief valve 440 and enters the interior of the casing 66 through pipe 439. This overflow falls by gravity over the mechanism within casing 66 furnishing lubrication thereto and collects at the bottom of casing 66. From there it passes by gravity through hole 520 (Figure 12) and drops onto the brake mechanism 372. This flow path is indicated diagrammatically in Figure 1 by the holes 520 which for convenience in illustration do not open above the brake mechanism in this figure. Most of this oil finds its way down past the brake mechanism and through bearings 358 (Figure 8) into the righthand portion of casing 64 which is the auxiliary reservoir 479. This oil collects in the auxiliary reservoir, since auxiliary pump pressure is holding one of the check valves 474—476 closed and main pump pressure is holding the other closed and there can accordingly be no drainage of this oil out of conduit 478. The auxiliary reservoir is filled in this manner soon after the motor 10 is first placed in operation and thereafter overflows into the tube 524. This overflow takes place over the top edge of the same in the actual construction illustrated in Figure 8 and is indicated diagrammatically in Figure 1 by the holes 522.

Once the auxiliary reservoir is filled, all the oil coming down through hole 520 has to pass down into tube 524. At the bottom end of the tube (Figures 5, 8 and 26) vertical slots 526 are provided in the blocks 508 and 506 permitting this oil to fall into the casing 58. The casing 58 is accordingly next filled and overflows (see Figure 7) around shaft 330 and through bearings 334 into the righthand portion of casing 56. This portion of the casing must be filled up to the overflow holes 528 (see Figures 7 and 15) before any oil can pass over into the lefthand portion of the casing 56 which is the main reservoir. During normal power operation the oil which overflows relief valve 440 is thus returned to the main reservoir and, in so doing, initially fills and thereafter maintains filled the auxiliary reservoirs.

While the form of embodiment of the invention as herein disclosed constitutes a preferred form, it is to be understood that other forms might be adopted, all coming within the scope of the claims which follow.

What is claimed is as follows:

1. In a fluid power transmission system the combination of a prime mover, a variable displacement pump driven by the prime mover, a fluid motor operable by fluid supplied by the pump and adapted to drive a load device imposing varying forces on the transmission system, a second fluid motor and a member movable thereby for controlling the displacement of the pump, means biasing the member to a neutral position, control means for admitting fluid to the second motor to operate the latter away from neutral position in either direction, and auxiliary control means for rendering said control means ineffective whereby the member may be moved toward neutral under the influence of the biasing means.

2. In a fluid power transmission system the combination of a prime mover, a variable displacement pump driven by the prime mover, a fluid motor operable by fluid supplied by the pump and adapted to drive a load device imposing varying forces on the transmission system, a second fluid motor and a member movable thereby for controlling the displacement of the pump, means biasing the member to a neutral position, control means for admitting fluid to the second motor for overcoming said biasing means to permit the pump displacement to be varied, and auxiliary control means for rendering the biasing means effective to operate the member regardless of the operation of the first control means.

3. In a fluid power transmission system the combination of a prime mover, a variable displacement pump driven by the prime mover, a fluid motor operable by fluid supplied by the pump and adapted to drive a load device imposing varying forces on the transmission system, a second fluid motor and a member movable thereby for controlling the displacement of the pump, means biasing the member to a neutral position, control means for overcoming said biasing means to permit the pump displacement to be varied, and auxiliary control means for rendering the biasing means effective to operate the member regardless of the operation of the first control means, said auxiliary control means including pressure responsive mechanism rendered effective upon overloading of the prime mover.

4. In a fluid power transmission system the combination of a prime mover, a variable displacement pump driven by the prime mover, a fluid motor operable by fluid supplied by the pump and adapted to drive a load device imposing varying forces on the transmission system, a second fluid motor and a member movable thereby for controlling the displacement of the pump, means biasing the member to a neutral position, control means for admitting fluid to the second motor to operate the latter away from neutral position in either direction, and auxiliary power limiting control means for rendering said control means ineffective whereby the member may be moved toward neutral under the influence of the biasing means when a predetermined horsepower load is exceeded.

5. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for driving the load device directly from the control means while the pump is ineffective, valve means for preventing operation of the motor as a pump by overload forces transmitted from the load device, and means responsive to the transmission of torque from said control means directly to the load device for rendering said valve means effective to permit operation of the motor from the control means when no overload forces are applied.

6. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for driving the load device directly from the control means while the pump is ineffective, valve means responsive to the transmission of torque from the control means directly to the load device for bypassing the fluid discharged by the motor acting as a pump when the load is directly driven, and means associated with said valve means for preventing bypassing flow in the reverse direction.

7. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for driving the load device directly from the control means while the pump is ineffective, valve means responsive to the transmission of torque from the control means directly to the load device for bypassing the fluid discharged by the motor acting as a pump when the load is directly driven, and means associated with said valve means for preventing bypassing flow in the reverse direction, said valve means acting, upon overrunning of the load device under external forces, to block the flow of fluid delivered by the motor tending to act as a pump.

8. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for driving the load device directly from the control means while the pump is ineffective, and valve means responsive to the transmission of torque from the control means directly to the load device for bypassing the fluid discharge by the motor acting as a pump when the load is directly driven, said valve means acting, upon overrunning of the load device under external forces, to block the flow of fluid delivered by the motor tending to act as a pump.

9. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for driving the load device directly from the control means while the pump is ineffective, torque responsive means for limiting the torque which may be thus transmitted to the load device, and means for connecting the motor to pump fluid idly in a forward direction but preventing back rotation by blocking the delivery of fluid therefrom.

10. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, pressure responsive valve means for preventing back flow through said motor in opposition to the flow delivered by the pump, control means for directing the flow of fluid to the motor to cause operation of the load device, additional means for driving the load device directly from the control means while the pump is ineffective, valve means for preventing operation of the motor as a pump by forces transmitted from the load device and below the safe torque capacity of the motor, and means responsive to the transmission of torque from said control means directly to the load device for rendering the last mentioned valve means effective to permit operation of the motor from the control means against normal load forces.

11. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, pressure responsive valve means for preventing either back flow through said motor in opposition to the flow delivered by the pump, or forward flow through said motor at a greater rate than the flow delivered by the pump, control means for directing the flow of fluid to the motor to cause operation of the load device, additional means for driving the load device directly from the control means while the pump is ineffective, valve means for preventing operation of the motor as a pump by forces transmitted from the load device and below the safe torque capacity of the motor, and means responsive to the transmission of torque from said control means directly to the load device for rendering the last mentioned valve means effective to permit operation of the motor from the control means against normal load forces.

12. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, means for driving the load device independently of the prime mover and the pump, torque responsive means for limiting the torque which may be thus transmitted to the load device, and means for connecting the motor to pump fluid idly in the direction induced by operation of said driving means but preventing reverse operation of the motor as a pump by load forces below the safe torque capacity of the motor by blocking the delivery of fluid therefrom.

13. In a fluid power transmission system the combination of a prime mover, a pump driven by the prime mover, a fluid motor operable by fluid delivered by the pump and adapted to drive a load device imposing varying forces on the transmission system, a pair of conduits forming a closed circuit connecting the pump and motor, means for driving the load device independently of the pump, a bypass conduit containing a check valve, and means responsive to torque transmitted to the load device by said independent load-driving means for connecting the motor to said bypass conduit.

14. In a fluid power transmission system the combination of a prime mover, a pump driven by the prime mover, a fluid motor operable by fluid delivered by the pump and adapted to drive a load device imposing varying forces on the transmission system, a pair of conduits forming a closed circuit connecting the pump and motor, means for driving the load device independently of the pump, a bypass conduit containing a check valve, and means responsive to torque transmitted to the load device by said independent load-driving means for connecting the motor to said bypass conduit, a check valve in each conduit open to flow from the pump to the motor, and means for bypassing one of said check valves in response to pressure in the other conduit.

15. In a fluid power transmission system the combination of a prime mover, a pump driven by the prime mover, a fluid motor operable by fluid delivered by the pump and adapted to drive a load device imposing varying forces on the transmission system, a pair of conduits forming a closed circuit connecting the pump and motor, means for driving the load device independently of the pump, a bypass conduit containing a check valve, valve means for connecting the two sides of the motor to said bypass conduit for flow through the motor selectively in either direction, and means responsive to torque transmitted to the load device by said independent load-driving means for shifting the valve means, a check valve in each conduit open to flow from the pump to the motor, valve means for selectively bypassing one of said check valves, and means for shifting the second valve means to bypassing position while the pump is driving the motor by fluid delivered through the other check valve.

16. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for directly driving the load device while the pump is ineffective, pressure responsive valve means for blocking flow to the pump when the pump is not operating, torque responsive valve means for bypassing the motor when the load device is directly driven by said additional means, said torque responsive valve means being connected in series with the pressure responsive valve means whereby the pressure responsive valve means is effective to block flow from the motor to the pump when an external force is applied to the load device sufficient to cause the latter to overrun the additional drive means.

17. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit pressure relief valve means in said conduits in permanent communication with the pump, control means for directing the flow of fluid to the motor to cause operation of the load device, additional means for directly driving the load device while the pump is ineffective, valve means for preventing the transmission of overloads from the motor to the pump through said conduits, valve means for preventing reverse operation of the motor during direct drive of the load device, and limit stop valve means for blocking the fluid motor upon a predetermined amount of travel thereof, said valve means being positioned in series in said conduits with the limit stop valve means nearest the fluid motor whereby the limit stop valve means is effective while the prime mover is driving the load device as well as while the additional driving means is effective.

18. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for directly driving the load device while the pump is ineffective, valve means for preventing the transmission of overloads from the motor to the pump through said conduits, valve means for preventing reverse operation of the motor during direct drive of the load device, and limit stop valve means for blocking the fluid motor upon a predetermined amount of travel thereof, the limit stop means being effective while the prime mover is driving the load device as well as while the additional driving means is effective.

19. In a fluid power transmission system the combination of a prime mover, a pump driven by the prime mover, a fluid motor operable by fluid delivered by the pump and adapted to drive a load device, a casing block containing said motor, a control valve in said block having a stem exposed exteriorly of said block, a fluid reservoir surrounding said casing block, and means for maintaining a supply of oil for sealing the exteriorly exposed parts against leakage of fluid or entrance of air to the system in the event of emptying of said reservoir.

20. In a fluid power transmission system the combination of a prime mover, a pump driven by the prime mover, a fluid motor operable by fluid delivered by the pump and adapted to drive a load device, a casing block containing said motor, and having a drive shaft exposed exteriorly of said block, a fluid reservoir surrounding said casing block, and means for maintaining a supply of oil for sealing the exteriorly exposed parts against leakage of fluid or entrance of air to the system in the event of emptying of said reservoir.

21. In a fluid power transmission system the combination of a prime mover, a pump driven by the prime mover, a fluid motor operable by fluid delivered by the pump and adapted to drive a load device, a fluid reservoir containing said pump and motor, means forming an upwardly projecting control casing communicating with said reservoir, an auxiliary reservoir in said control casing, control means for the transmission system positioned in said control casing, an auxiliary pump driven by the prime mover for supplying fluid to said control means, a relief valve for said auxiliary pump, means for conducting fluid spilled over the relief valve to said auxiliary reservoir, and means for supplying fluid from the auxiliary reservoir to the low pressure side of the fluid motor.

22. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, means for driving the load device independently of the prime mover and the pump, auxiliary pump means driven by the prime mover, means for selectively connecting or disconnecting the direct drive means to or from the load device, and means responsive to pressure developed by said auxiliary pump for operating the last means to disconnect the direct drive means from the load device.

23. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, means for driving the load device independently of the prime mover and the pump, auxiliary pump means driven by the prime mover, means for selectively connecting or disconnecting the direct drive means to or from the load device, means responsive to pressure developed by said auxiliary pump for operating the last means to disconnect the direct drive means from the load device, and means for disabling the control means while the direct driving means is connected to the load device.

24. In a fluid power transmission system the combination of a prime mover, a pump driven by the prime mover, a fluid motor operable by fluid supplied by the pump and adapted to drive a load device imposing varying forces on the transmission system, conduits connecting the pump and motor in a closed circuit, control means for directing the flow of fluid to the motor to cause operation of the load device, additional means for driving the load device directly from the control means while the pump is ineffective, said additional means including a clutch for connecting the control means to the load device directly, and means responsive to operation of the prime mover for engaging and disengaging said clutch.

25. In a fluid pressure control system the combination of a primary controlling member, a controlled member, variable speed, power operated means for driving the controlled member, a member movable to vary the speed of the controlled member, a fluid motor connected to operate the movable member, a pump operable by the primary controlling member, a pump operable by the controlled member, conduits connecting said pumps and said motor for operation of the latter only in response to non-synchronous operation of the pumps, and means for maintaining synchronism between the primary controlling member and the controlled member regardless of leakage of fluid from said conduits.

26. In a fluid pressure control system the combination of a primary controlling member, a controlled member, variable speed, power operated means for driving the controlled member, a member movable to vary the speed of the controlled member, a fluid motor connected to operate the movable member, a pump operable by the primary controlling member, a pump operable by the controlled member, conduits connecting said pumps and said motor in a parallel circuit, and means for replenishing said circuit in response to a predetermined deviation in the relative positions of the controlling member and controlled member.

27. In a fluid pressure control system the combination of a primary controlling member, a controlled member, variable speed, power operated means for driving the controlled member, fluid pressure operated follow-up means for controlling operation of the power operated means, and a pilot follow-up control means for compensation for errors in the first mentioned follow-up means.

28. In a hydraulic power transmission system the combination with a load device to be driven, a prime mover, and a manual input member for controlling and driving the load device, the combination of a hydraulically-operated, follow-up controlled torque amplifier connected to be driven by the prime mover and controlled by the input member to drive the load device with a predetermined ratio between input member speed and load speed, a direct mechanical connection for driving the load device from the input member at a lower speed ratio, and means for selectively rendering either said torque amplifier or said mechanical connection effective to drive the load.

29. In a hydraulic power transmission system the combination with a load device to be driven, a prime mover, and a manual input member for controlling and driving the load device, the combination of a hydraulically-operated, follow-up controlled torque amplifier connected to be driven by the prime mover and controlled by the input member to drive the load device with a predetermined ratio between input member speed and load speed, a direct mechanical connection for driving the load device from the input member at a lower speed ratio, and means responsive to operation of the prime mover for disabling the torque amplifier and rendering said mechanical connection effective.

HARRY F. VICKERS.